(12) United States Patent
Mandri

(10) Patent No.: US 6,549,751 B1
(45) Date of Patent: Apr. 15, 2003

(54) MULTIMEDIA EDUCATIONAL SYSTEM

(76) Inventor: Giuseppe Li Mandri, 3 Golf La., Mendham, NJ (US) 07945

( * ) Notice: Subject to any disclaimer, the term of this patent is extended or adjusted under 35 U.S.C. 154(b) by 0 days.

(21) Appl. No.: 09/625,462

(22) Filed: Jul. 25, 2000

(51) Int. Cl.[7] .................................................. G09B 5/00
(52) U.S. Cl. ........................ 434/350; 434/118; 434/362; 434/323; 706/927
(58) Field of Search .................................. 434/118, 234, 434/276, 322, 323, 327, 335, 336, 350, 351, 354, 362, 365; 345/705, 733, 854, 978; 700/91; 703/2, 11; 705/10, 14, 27; 706/927; 709/206

(56) References Cited

U.S. PATENT DOCUMENTS

| | | | |
|---|---|---|---|
| 3,461,571 A | 8/1969 | Luxton | |
| 3,606,688 A | 9/1971 | Zawels et al. | |
| 3,624,929 A | 12/1971 | Swanson et al. | |
| 3,641,685 A | 2/1972 | Zawels et al. | |
| 3,783,257 A | 1/1974 | Friedman et al. | |
| 4,159,417 A | 6/1979 | Rubincam | |
| 4,764,120 A | 8/1988 | Griffin et al. | |
| 4,855,725 A | 8/1989 | Fernandez | |
| 4,867,685 A | * 9/1989 | Brush et al. ................ 434/234 |
| 5,176,520 A | 1/1993 | Hamilton | |
| 5,204,813 A | 4/1993 | Samph et al. | |
| 5,263,869 A | 11/1993 | Ziv-El | |
| 5,339,091 A | 8/1994 | Yamazaki et al. | |
| 5,437,552 A | 8/1995 | Baer et al. | |
| 5,437,555 A | 8/1995 | Ziv-El | |
| 5,438,344 A | 8/1995 | Oliva | |
| 5,458,494 A | 10/1995 | Krohn et al. | |
| 5,466,158 A | 11/1995 | Smith, III | |
| 5,475,398 A | 12/1995 | Yamazaki et al. | |
| 5,475,399 A | 12/1995 | Borsuk | |
| 5,477,510 A | 12/1995 | Ukita | |
| 5,534,888 A | 7/1996 | Lebby et al. | |
| 5,636,995 A | 6/1997 | Sharpe, III et al. | |
| 5,645,432 A | 7/1997 | Jessop | |
| 5,663,748 A | 9/1997 | Huffman et al. | |
| 5,696,982 A | 12/1997 | Tanigawa et al. | |
| 5,697,793 A | 12/1997 | Huffman et al. | |
| 5,717,856 A | 2/1998 | Carleton et al. | |
| 5,717,938 A | 2/1998 | Garthwaite et al. | |
| 5,727,950 A | * 3/1998 | Cook et al. ................. 434/350 |
| 5,761,485 A | 6/1998 | Munyan | |
| 5,761,682 A | 6/1998 | Huffman et al. | |
| 5,764,913 A | 6/1998 | Jancke et al. | |
| 5,774,109 A | 6/1998 | Winksy et al. | |
| 5,802,516 A | 9/1998 | Shwarts et al. | |
| 5,803,748 A | 9/1998 | Maddrell et al. | |
| 5,809,247 A | 9/1998 | Richardson et al. | |
| 5,810,604 A | 9/1998 | Kopp, Jr. et al. | |
| D399,526 S | 10/1998 | Brady | |
| 5,820,379 A | 10/1998 | Hall et al. | |
| 5,823,788 A | * 10/1998 | Lemelson et al. .......... 434/350 |
| 5,829,985 A | 11/1998 | Campanella | |
| 5,835,722 A | 11/1998 | Bradshaw et al. | |

(List continued on next page.)

OTHER PUBLICATIONS

Cox, Meki "Textbooks Enter Online World", AP Apr. 9, 2000, Alta Vista Live, 2 pages.

beyondbooks.com: Overview; Programs; Building Blocks, Apr. 12, 2000, 5 pages.

*Primary Examiner*—Joe H. Cheng
(74) *Attorney, Agent, or Firm*—Ernest D. Buffs & Associates; Ernest D. Buff; Dave Narasimhan

(57) ABSTRACT

A multimedia teaching system and method incorporates portable electronic textbooks, connected in a seamless and secure fashion to supplementary materials, for example on the Web or an intranet. Instructors identify student mistakes as they are being made and direct students to supplementary material. Real-time two-way communication between student and instructor is initiated by both the student and the instructor.

18 Claims, 4 Drawing Sheets

U.S. PATENT DOCUMENTS

| | | |
|---|---|---|
| D402,310 S | 12/1998 | Hendricks |
| 5,847,698 A | 12/1998 | Reavey et al. |
| 5,851,119 A | 12/1998 | Sharpe, III et al. |
| 5,893,109 A | 4/1999 | DeRose et al. |
| 5,897,324 A | 4/1999 | Tan |
| D410,028 S | 5/1999 | Fyffe |
| 5,915,973 A | 6/1999 | Hoehn-Saric et al. |
| 5,934,909 A | 8/1999 | Ho et al. |
| 5,941,957 A | 8/1999 | Ingrassia, Jr. et al. |
| 5,954,515 A | 9/1999 | Iggulden |
| 5,956,027 A | 9/1999 | Krishnamurthy |
| 5,956,034 A | 9/1999 | Sachs et al. |
| 5,956,048 A | 9/1999 | Gaston |
| 5,957,697 A | 9/1999 | Iggulden et al. |
| 5,957,699 A | 9/1999 | Peterson et al. |
| 5,974,446 A | 10/1999 | Sonnenreich et al. |
| 5,986,690 A | 11/1999 | Hendricks |
| 5,991,594 A | 11/1999 | Froeber et al. |
| 6,009,429 A | 12/1999 | Greer et al. |
| 6,021,306 A | 2/2000 | McTaggart |
| 6,024,577 A | 2/2000 | Wadahama et al. |
| 6,037,954 A | 3/2000 | McMahon |
| 6,041,215 A | 3/2000 | Maddrell et al. |
| 6,075,968 A * | 6/2000 | Morris et al. ............... 434/118 |
| 6,091,930 A * | 7/2000 | Mortimer et al. ........... 434/362 |
| 6,149,441 A * | 11/2000 | Pellegrino et al. .......... 434/350 |
| 6,164,974 A * | 12/2000 | Carlile et al. ............... 434/322 |
| 6,261,103 B1 * | 7/2001 | Stephens et al. ............ 434/276 |
| 6,301,462 B1 * | 10/2001 | Freeman et al. ............ 434/350 |
| 6,315,572 B1 * | 11/2001 | Owens et al. ............... 434/322 |
| 2001/0042002 A1 * | 11/2001 | Koopersmith ................ 705/10 |
| 2001/0042098 A1 * | 11/2001 | Gupta et al. ................ 709/206 |

* cited by examiner

MULTIMEDIA EDUCATIONAL SYSTEM

BACKGROUND OF THE INVENTION

1. Field of Invention

This invention relates to teaching systems and in particular to systems utilizing a variety of media.

2. Description of Prior Art

Despite many advances in technology, students today still rely upon media which was developed circa 1500, the printed textbook. Print books have many disadvantages. Production of print books is costly and print books, due to their size and weight arm difficult to distribute, carry, and store. A print book can only be in one place at one time and often it is forgotten at home and unavailable to the student while attending class.

Medical problems such as scoliosis can be the result of carrying heavy print books to the extent that some school systems have taken action to reduce book transport. Solutions to the problem usually involve the expense of purchasing extra copies of texts for use in school.

School systems must recycle costly print texts from one child to the next. Students may not write in, underline, or annotate texts because they must be reused. Often texts are outdated because of the cost involved in replacing a print book which may require only a few pages of update, albeit important pages.

Print texts, by their nature, are outdated because of the lag between authoring and publication time. This situation has been exacerbated in recent years, because the rate at which new information is being produced and disseminated has increased greatly. Accordingly, textbook use and library research are to some extent being replaced by electronic media, particularly the World Wide Web (Web). Teachers may be aware of new materials on the Web but lack a means for seamlessly integrating this information with many existing texts. Although some texts may refer to web sites, these web site lists quickly become outdated because the Web is not static. Also, because of the inconvenience involved in accessing both a textbook and a PC, students do not have the time or motivation to augment each aspect of every text they receive with multimedia material.

Furthermore, when a student is using a print textbook, the instructor has no way of knowing if the student is absorbing the material, if the student is having difficulty with a particular concept, or has a misunderstanding. The only way for the instructor to determine student difficulty is after the fact, when the student does poorly on a test. If a student is having difficulty with a lesson, the student does not have a private method for communicating with the instructor but must raise his or her hand. "Calling out" or simply requesting help is discouraged by most instructors who prefer to control the flow of questions. Students with disabilities such as hearing loss or low vision may find it difficult to talk with the teacher or to use a print book.

The prior art does not disclose an environment which would overcome these educational disadvantages. Systems for communicating with students include U.S. Pat. No. 5,176,520 to Hamilton, and U.S. Pat. No. 5,263,869 to Ziv-El. The '520 patent discloses means for instructor and student to share an electronic "sheet" of paper. The '869 patent enables student terminals to connect to a teacher's terminal. Students can access materials on the teacher's terminal and the teacher can monitor students' work and respond to questions. However neither system includes links to supplementary material or a "callable teaching assistant" which will identify errors.

Several systems provide electronic books (e-books), for example U.S. Pat. No. 5,535,888 to Lebby et al., U.S. Pat. No. 5,761,485 to Munyan, and U.S. Pat. No. 5,956,034 to Sachs et al. However, none of these patents disclose communication between teacher and students pursuing a course of study.

Patents which describe linking multimedia supplementary material, link the material to print text, not electronic text and do not disclose a teacher-student environment with bi-directional communication. For example U.S. Pat. No. 5,954,515 to Igguiden describes a method for augmenting a print text by providing graphical indicia at points in the text indicating that supplementary materials from a host computer are available for download. However, neither a teaching environment nor means for communicating with an instructor are disclosed. Likewise, U.S. Pat. No. 5,645,432 to Jessop discloses linking audiovisual material to print text aligned with pressure sensing means, when the user presses portions of the print material. These supplementary materials must be inserted into the device and are not located on a remote computer. The '432 patent does not disclose a teaching assistant function, or callable links, and communication is limited to output generated by a pressure sensing means.

U.S. Pat. No. 6,009,429 to Greer et al. and U.S. Pat. No. '247 to Richardson et al disclose web-touring systems which guide the user to supplementary material. In the '247 patent, a web tour stop vector is programmed to direct client systems to specific sites. In the '429 patent, a teaching web page supplements a source web page, and may include additional information about the source web page. However, neither patent discloses communication with an instructor.

Accordingly, it would be desirable to provide the student with a portable electronic textbook, connected in a seamless and secure fashion to supplementary materials, for example on the Web or an intranet, whereby the instructor could provide these materials in an individualized and customized manner. Real-time two-way communication between student and instructor would take the form of student initiated immediate help, as well as real-time instructor initiated help. Instructors would have the ability to identify mistakes and to direct students to supplementary material.

SUMMARY OF THE INVENTION

The present invention provides a system and method for providing students with a portable electronic textbook which can be connected to network systems. Through arrangements with publishing companies, school districts can license a book for electronic distribution to authorized users. The full text can reside on an intranet or extranet, available for download to a portable computerized device, the NoBook™, when the student supplies an access code. The NoBook student workstation can be connected to the intranet via a docking station, wireless communication, or other means. The instructor is provided with authoring capability such that the instructor can annotate the electronic textbook with links to supplementary multimedia material. Students may access hypermedia material stored locally or on the World Wide Web. The instructor is able to view the student's real-time performance on exercises and to refer the student to additional material or remedial work. This may be accomplished for example, through screen sharing hardware and software, enabling the instructor to view the student's screen and/or transmit the instructor's screen to the student. The student may privately contact the instructor with requests for additional help. This may be accomplished, for example, through a messaging system or by software polling of student workstations.

BRIEF DESCRIPTION OF THE DRAWINGS

The invention will be more fully understood and further advantages will become apparent when reference is had to the following detailed description and the accompanying drawings, in which.

DESCRIPTION OF THE PREFERRED EMBODIMENTS

Figure 1:
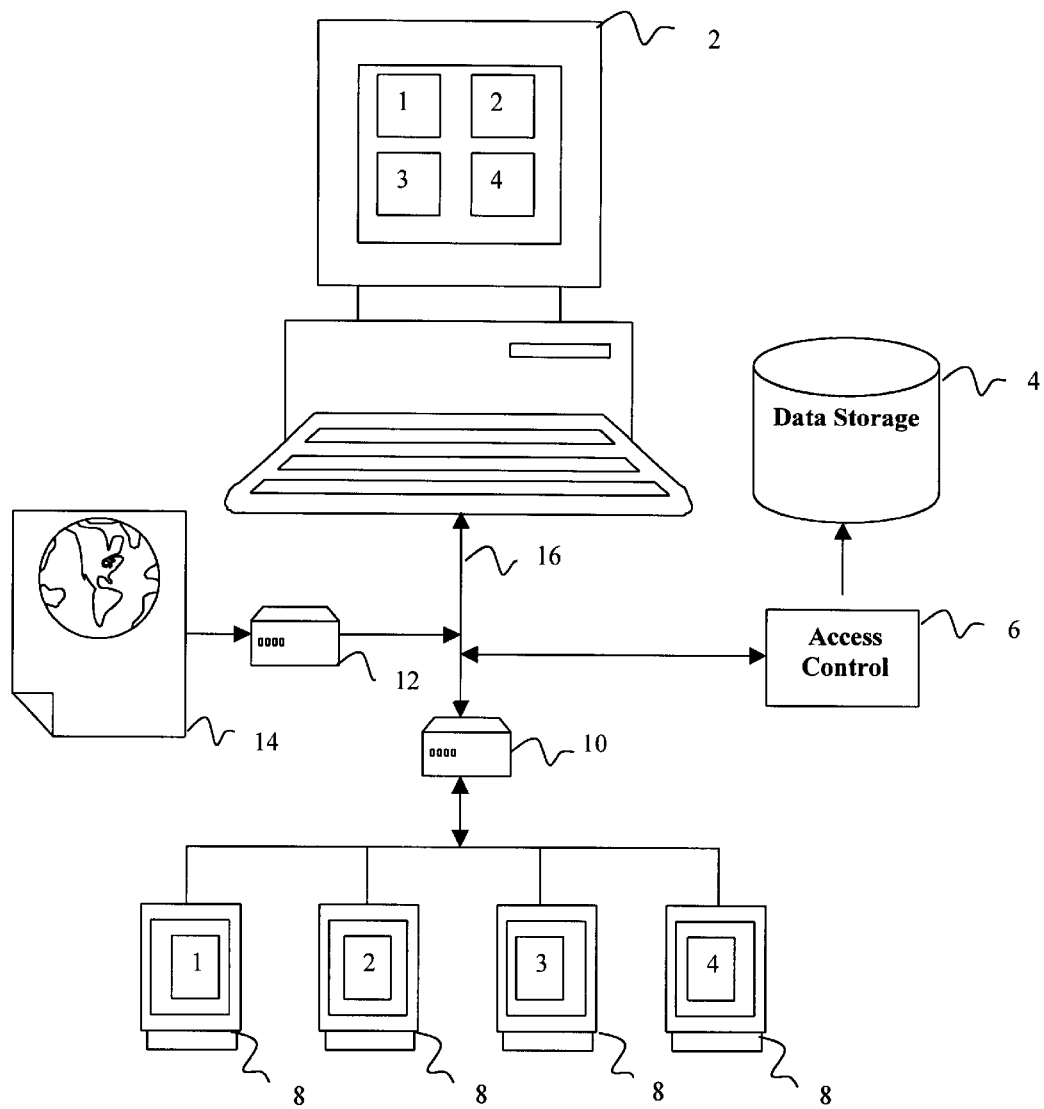
FIG. 1 is a schematic representation depicting a system on which the present invention may be implemented.

FIG. 1 shows a representative embodiment of a system on which the present invention may be implemented. In this embodiment, an instructor's workstation 2 is bi-directionally connected to one or more student workstations 8 in a network configuration 16. The student workstations may be desktop computers or lap top computers attached to the network through docking stations, or connected through an infrared wireless connection, for example. Additionally, the student workstations may also be connected to specialized e-book devices such as those available from Rocket and SoftBook. These devices, which weigh about two pounds, display text in a highly readable format. The network 16 may be, for example, a conventional local area network (LAN) such as provided by Novell Corporation, where the components are connected through cabling, or it may employ a wireless connection.

The data storage device 4 is used for storing text, for example, the complete text of textbooks. Currently, Nuvo-Media's Rocket Library and Fatbrain.com's eMatter offer downloadable electronic books for a fee, as has Simon & Schuster. "A new chapter for e-books," by Stephen H. Wildstrom, which appeared in the Mar. 27, 2000 issue of *Business Week* indicates that electronic textbooks will be available shortly.

The student workstations 8 connect to the data storage device 4 though an access control device 6. Each student workstation has a unique access code. When a student wants to download a book from the data storage device 4, the student submits a unique code, specific to the workstation or e-book device. This access code is compared with a stored key and the download is only permitted when there is a match.

The instructor's workstation 2 has the ability to access the books stored on the data storage device 4 and to annotate them with hyperlinks to supplementary information. This supplementary information may include multimedia such as graphical animations, video clips, music, web pages in hypertext markup language (html) and the like. These media may be stored locally on the network, for example in the data storage device 4. The hyperlinks may also include links to the Internet 14, which is accessible through a communication device 12 which can be a modem, a gateway computer, or other connecting device.

Bi-directional communication between the instructor's workstation 2 and the student workstations 8 can be in the form of pop up message windowing or through a communications device 10 such as the Video Classroom Commander from Network Technologies, Inc. Such devices, well known in the art, allow the instructor to view what is displayed on the student workstations 8 as well as to transmit the screen display of the instructor's workstation 2 to the student workstations 8.

Figure 2:
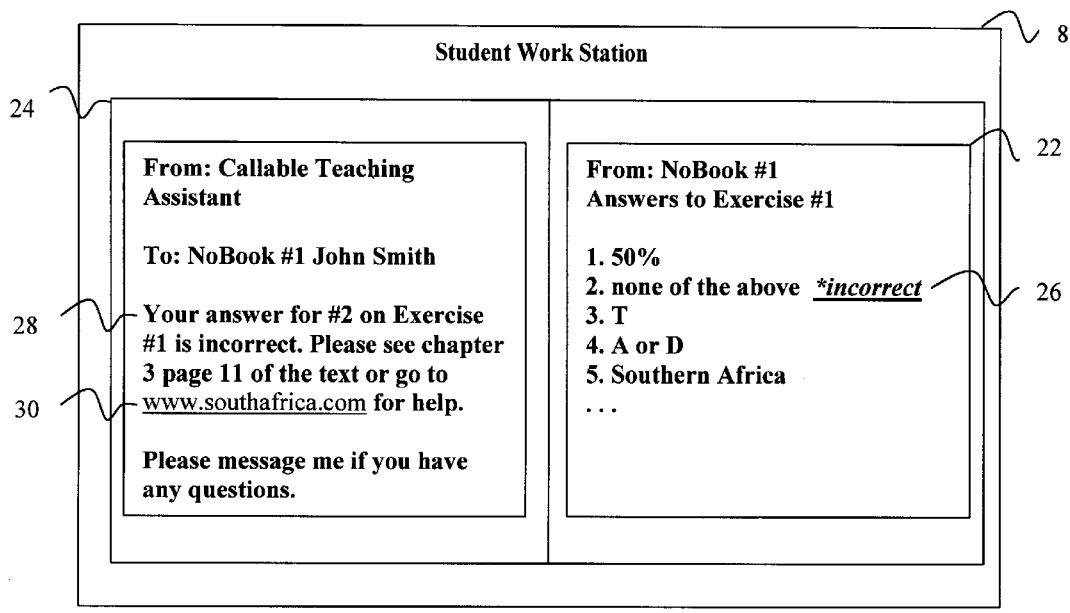
FIG. 2 is a front view of a student's computer screen depicting a pop-up window 24 from the instructor's work station, which is monitoring a student exercise and providing real time, supplementary material that enables correction of the student's incorrect answers.

FIG. 2 is an illustration of the instructor's workstation 2 monitoring a student's response to an exercise in the electronic textbook and providing a response in a separate pop-up window 24 on the student's workstation 8. The student's screen is captured and transmitted by the communications device 10, shown in FIG. 1, and displayed in a window 22 with an incorrect answer indicated 26. Software on the instructor's workstation 2 or the student's workstation 8 may make this indication, either visually as shown, through a flashing light, or audibly. Alternatively, the instructor may also visually compare the student's answers to a key displayed in the window.

The instructor, acting as a "callable teaching assistant" responds to the appropriate student workstation 8 through the network 16 and the communications device shown in FIG. 1. The instructor's monitor displays student's monitors 1, 2, 3 and 4 enabling real time direction by the instructor. The instructor's real time response is shown in a window 24 on FIG. 2, and it is transmitted through the network 15 and the communications device 10 to the appropriate student workstation 8. The instructor indicates where the student should look for additional information that will enable the student to correct his incorrect answer 26. The supplementary information may be a section of the electronic book 28 or a Web page 30 for example. Alternatively, the instructor may correspond with the student using a pop up window utility such as WinPopup™ feature of the Windows™ operating system. Alternatively the student's answers to the exercise may be captured in an html form and transmitted to the instructor's workstation for display in the window 22 or to an email account for later grading.

Figure 3:
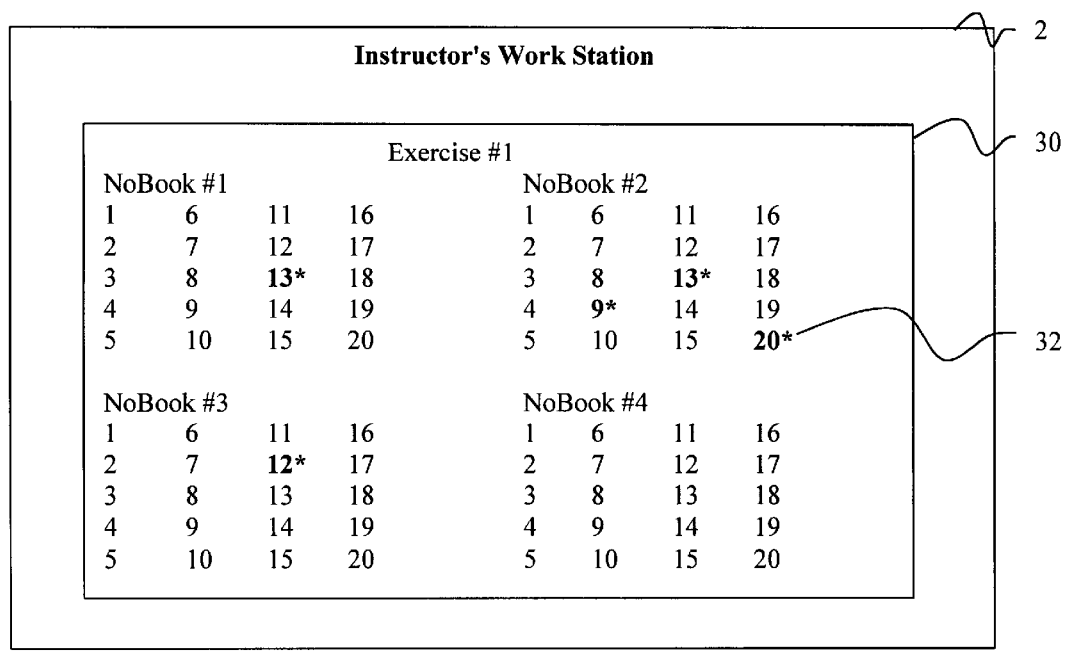
FIG. 3 is a front view of a computer screen illustrating the instructor's work station displaying a student error matrix.

FIG. 3 illustrates the instructor's workstation 2 displaying a status matrix of student errors 30. Errors are marked with an asterisk 32. In this example, question number 20 has been answered incorrectly on student workstation number 2. The instructor can view the number of errors on each workstation and determine the sequence in which to assist students.

Figure 4:
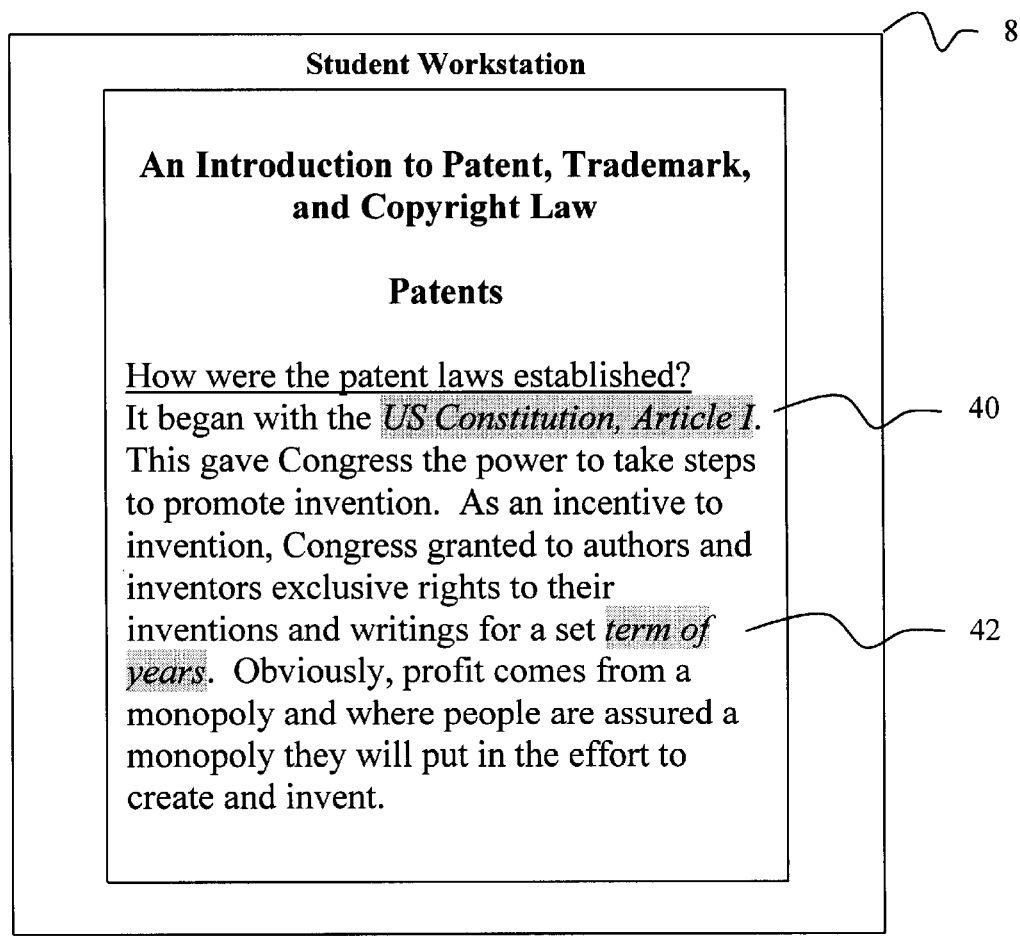
FIG. 4 is a front view of a computer screen depicting the student workstation displaying an electronic book with links to supplementary information.

FIG. 4 is an illustration of a portion of an electronic textbook with supplementary links 40 42 as it would be displayed on a student workstation 8 or e-book device. As the student reads through the electronic book, the student may click on the hypertext links 40 42 and view additional information. For example, the top link 40 could download and display the portion of the US Constitution cited, from the data storage device 4. Alternatively, the link 40 could download a multimedia web page about the Constitution from the Internet 14. The bottom link 42 could download and display the portion of the patent law which defines this term or download the materials on the US Patent and Trademark Office web site that discuss the length of patent protection.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A bi-directional, real time, teaching system, comprising:
   a) at least one book in computer-readable format containing links to supplementary information;
   b) a data storage device for storing one or more of the books;
   c) at least one student computer for downloading, storing, and displaying one or more books stored on the data storage device;
   d) an instructor computer for communicating with at cast one student computer and the data storage device;
   e) an intra network connecting the data storage device, one or more student computers, and the instructor computer;
   f) a first communications device for connecting the intra network with an external network;
   g) a second communications device for displaying information contained within the student computer on the instructor's computer and information contained within the instructor's computer on the student's computer; and
   h) callable teaching assistant means for providing real time, supplementary information that enables the student to correct incorrect answers.

2. A system as recited by claim 1 wherein the student computer is portable.

3. The system according to claim 2 wherein at least one student computer can send a message to the instructor computer and the instructor computer can respond to the message.

4. A system as recited by claim 1 wherein the external network is the Internet.

5. A system as recited by claim 1 wherein the links are to supplementary information retrievable from the data storage device on the intra network or a computer on the external network.

6. The system according to claim 1 wherein the instructor computer monitors answers to questions on at least one student computer and transmits appropriate supplementary material to the student computer when an incorrect answer is identified.

7. The system according to claim 6 wherein the monitoring and transmission of supplementary material is real-time.

8. The system according to claim 1 wherein an access control portion compares a code transmitted by the student computer with a stored key specific to the student computer and downloads the book to the student computer when there is a match.

9. A method for providing multimedia instruction to students on a bi-directional, real time teaching system, comprising the steps of:
   a) storing at least one book in computer-readable format on a data storage device;
   b) displaying the book on at least one student computer;
   c) linking the book to supplementary material;
   d) using an instructor computer to communicate with at least one student computer and the data storage device;
   e) connecting the data storage device, one or more student computers and the instructor computer to an intra network;
   f) connecting the intra network to an external network;
   g) displaying information contained within the student computer on the instructor's computer and information contained within the instructor's computer on the student's computer; and
   h) providing real time, supplementary information from callable teaching assistant means that enables the student to correct incorrect answers.

10. The method according to claim 9 wherein the supplementary information is downloaded from the data storage device on the intra network to at least one student computer.

11. The method according to claim 9 further wherein the supplementary information is downloaded from the external network to at least one student computer.

12. The method according to claim 9 further including the step of monitoring answers to questions on at least one student computer and transmitting appropriate supplementary material to the student computer from the data storage device when an incorrect answer is identified by the instructor computer.

13. The method according to claim 12 wherein the monitoring of answers and the transmitting supplementary material is real-time.

14. The method according to claim 9 further including the step of sending a message from at least one student computer to the instructor computer and receiving a response to the message from the instructor computer.

15. The method according to claim 9 further including the step of transmitting a code to an access control portion for comparing the code with a stored key specific to the student computer, and downloading the book to the student computer when there is a match.

16. A method of providing multimedia instruction to students, comprising the steps of:
   a) storing at least one book in computer-readable format on a data storage device;
   b) displaying the book on at least one student computer;
   c) linking the book to supplementary material;
   d) using an instructor computer to communicate with at least one student computer and the data storage device;
   e) connecting the data storage device, one or more student computers and the instructor computer to an intra network;
   f) connecting the intra network to an external network;
   g) displaying information contained within the student computer on the instructor's computer and information contained within the instructor's computer on the student's computer; and
   h) providing real time, supplementary information from callable teaching assistant means that enables the student to correct incorrect answers.

17. An apparatus for providing multimedia instruction to students comprising:
   means for storing at least one book in computer-readable format on a data storage device;
   means for displaying the book on at least one student computer;
   means for linking the book to supplementary material;
   means for an instructor computer to communicate with at least one student computer and the data storage device;
   means for connecting the data storage device, one or more student computers and the instructor computer to an intra network;
   means for connecting the intra network to an external network;

means for displaying information contained within the student computer on the instructor computer and information contained within the instructor's computer on the student's computer; and callable teaching assistant means for providing real time, supplementary information that enables the student to correct incorrect answers.

18. Computer executable process steps to provide multimedia instruction to students, the computer-executable process steps being stored on a computer-readable medium and comprising:

a) a storing step for storing at least one book in computer-readable format on a data storage device;

b) means for displaying the book on at least one student computer, c) a linking step for linking the book to supplementary material;

c) a communicating step for an instructor computer to communicate with at least one student computer and the data storage device;

d) a first connecting step for connecting the data storage device, one or more student computers and the instructor computer to an intra network;

e) a second connecting step for connecting the intra network to an external network;

f) a displaying step for displaying information contained within the student computer on the instructor's computer and information contained within the instructor's computer on the student's computer; and g) callable teaching assistant means for providing real time, supplementary information that enables the student to correct incorrect answers.

* * * * *